United States Patent [19]
Strusinski

[11] 3,891,842
[45] June 24, 1975

[54] OPTICAL DEVICE
[76] Inventor: Mary R. Strusinski, 5132 31st St., Detroit, Mich. 48210
[22] Filed: May 10, 1974
[21] Appl. No.: 468,918

[52] U.S. Cl. ..... 240/1.4; 178/DIG. 1; 178/DIG. 30; 178/DIG. 38; 178/7.85; 178/7.87; 178/7.89; 240/2 R; 240/41.15
[51] Int. Cl. ............................................ H04n 7/18
[58] Field of Search ......... 178/7.85, 7.89, 7.92, 7.8, 178/7.81, 7.87, DIG. 38, DIG. 30; 240/41.15, 52.2, 1.3, 1.4; 354/293

[56] References Cited
OTHER PUBLICATIONS
R.C.A. "Closed–Circuit Television System" (3-1-0-60) pp. 180–181.

*Primary Examiner*—Robert L. Griffin
*Assistant Examiner*—Edward L. Coles
*Attorney, Agent, or Firm*—David A. Maxon

[57] ABSTRACT

A device that acts as a handle for a light used in surgery and also acts as a holder for a television camera such that the camera is aimed in the direction of maximum intensity of the light.

5 Claims, 5 Drawing Figures

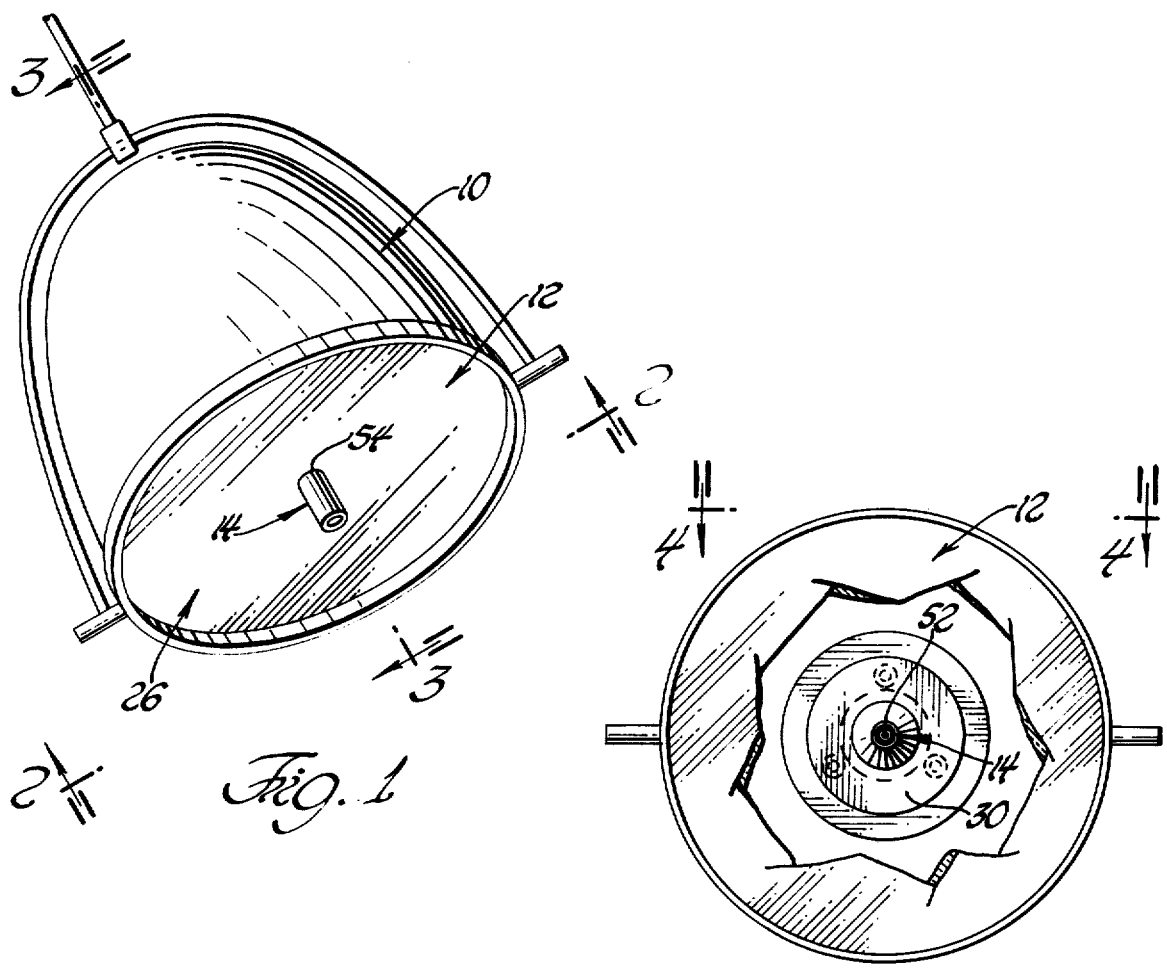
Fig. 1
Fig. 2
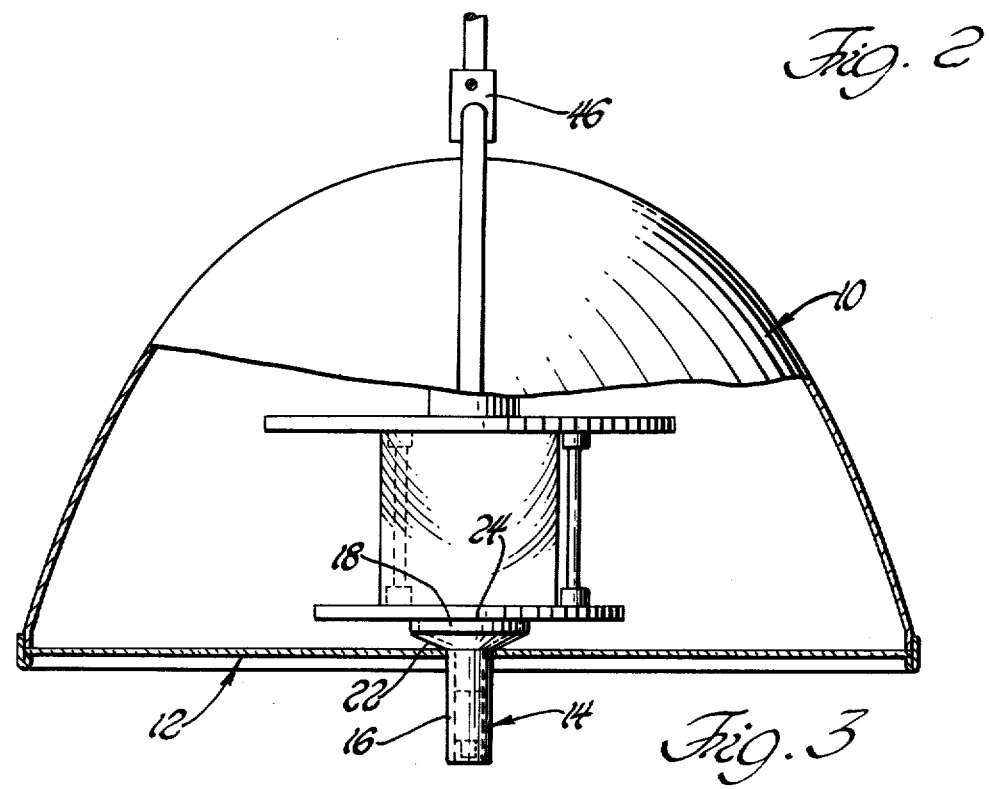
Fig. 3

OPTICAL DEVICE

This invention relates generally to means of maneuvering a light used in surgery whereby maximum intensity of the light is directed to the point of maximum utility for the surgeon to give maximum intensity and also includes means for holding a camera such as a television camera to be directed at the point of maximum interest at the preferred time during surgery.

In the past high intensity lamps, particularly large, heavy lamps that have high luminary intensity, have been provided for surgical purposes. These lamps can be provided on gimbaled mounting or other type of mounting that allows movement of the lamp to the direction of maximum interest and utility during surgery. These lamps can be maneuvered to the point for desired maximum effect, however, when the surgery is being photographed or televised it is difficult to appropriately place the camera in a position for the desired reproduced effect that does not interfere either with the surgical field or with the optimum placement of lamps providing light for the surgery as well as for the photographing or televised reproduction of that surgery.

Accordingly, it is an object of this invention to provide means of directing the lamp for maximum effect of lighting capability during surgery while simultaneously directing a camera in precisely the same direction for maximum photographic or television reproduction effect without interfering with the surgical field.

These and other objects of this invention are achieved by the provision of a handle fixed near the center of a large surgical lamp and having means of holding a camera and directing the camera in the direction of maximum luminary effect from the surgical lamp.

These and other objects of this invention can be more fully understood from the following specifications and claims.

ON THE DRAWINGS

FIG. 1 is a three-dimensional view of a preferred embodiment of this invention;

FIG. 2 is a plan view of the face of the lamp showing the preferred embodiment of this invention;

FIG. 3 is a transverse sectional view of the apparatus shown in FIG. 2;

Figure 4:
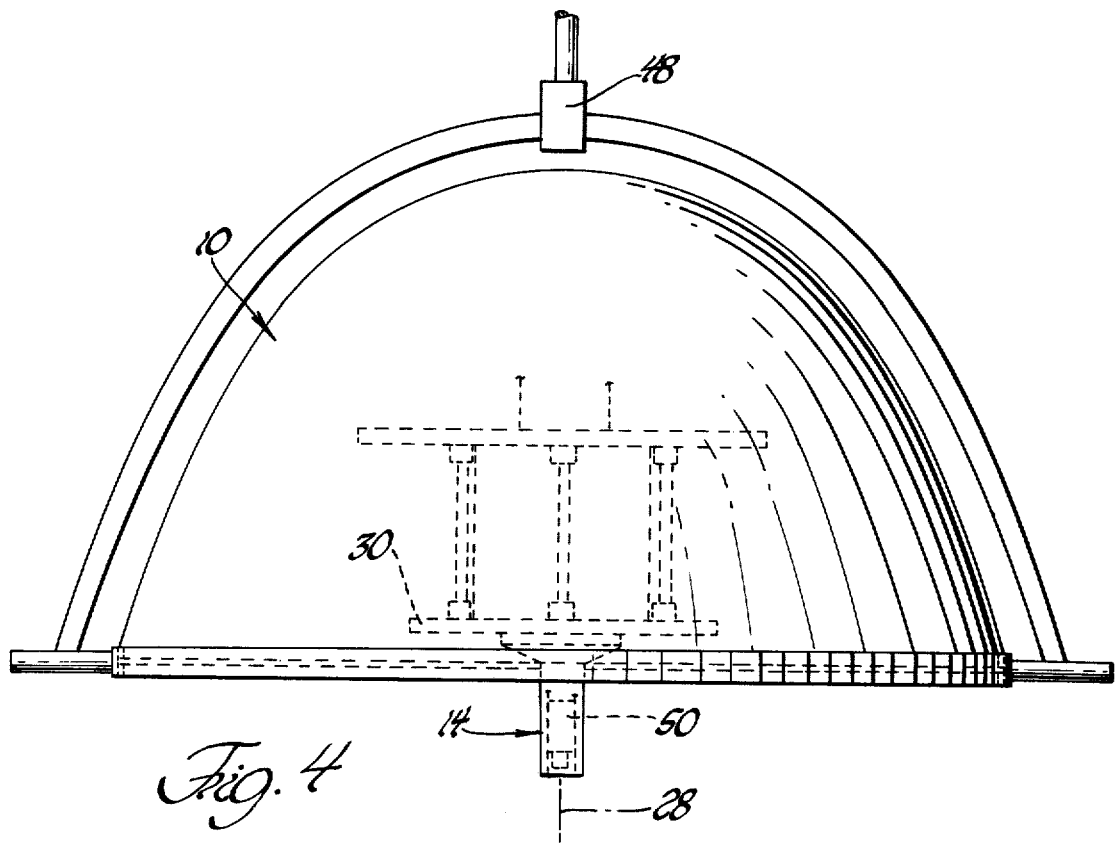
FIG. 4 is an orthogonal projection of a side view of the apparatus shown in FIG. 2.
Figure 5:
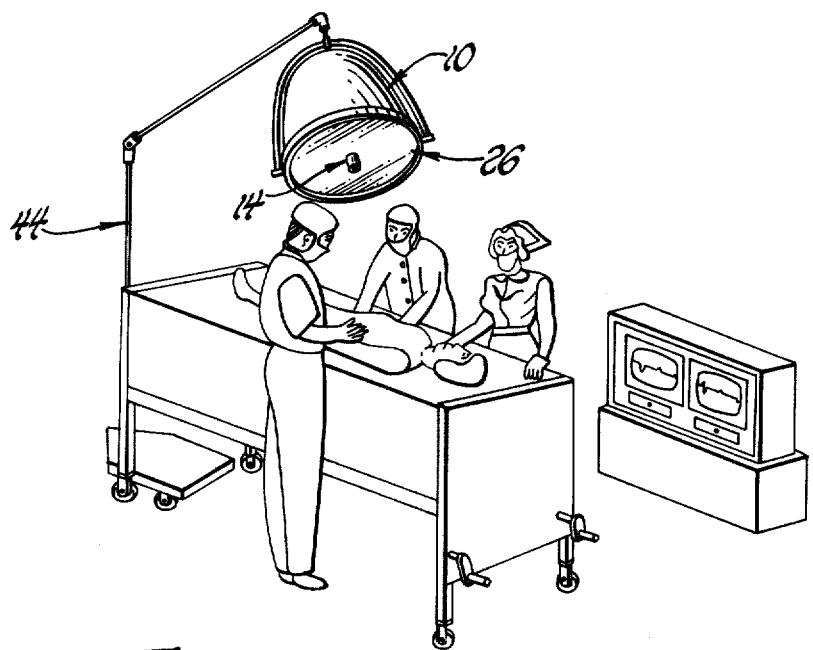
FIG. 5 is a view of the preferred embodiment of this invention as shown in a surgical setting in a three-dimensional illustration.

Before explaining the present invention in detail, it is to be understood that the invention is not limited in its application to the details in construction and arrangement of parts illustrated in the accompanying drawings since the invention is capable of other embodiments and of being practiced or carried out in various ways.

Also, it is to be understood that the phraseology and terminology employed herein are for the purpose of description and not of limitation.

AS SHOWN ON THE DRAWINGS

The preferred embodiment of the invention as shown in the drawings relates to a lamp and handle combination 10. The combination 10 comprises a high intensity lamp 12 and a special holder mounted on the lamp 14. The lamp is of a large diameter, being on the border of at least 2 feet, and high intensity lamp used for illumination purposes in medical surgery.

The holder 14 comprises a central body member 16 and a mounting bracket 18 located near the top end 20 of the holder, and a flared-like bottom portion 22 located near the bottom 24 of the holder.

The direction of maximum intensity of the lamp 12 is along the central axis of the circular lamp face 26. This direction of maximum intensity is shown along axis 28 which is perpendicular to the lamp face 26. The holder 14 is held by mounting brackets 30 and bolts or other means that will provide a rigid attachment to the lamp 12.

The lamp 12 is preferably rotatable pivotally and in a gimbaled manner attached to a lamp holding device such as a stand 44. The gimballing device 46 is preferably located above the lamp face 26, or behind the lamp face 26, depending upon the position of the observer, in such a manner that the center of gimballing 48 is above or in back of the lamp face 26 and is co-linear with the axis 28 so that the point of gimballing 48 or center of rotation when the lamp is rotated is in a geometrically central position with respect to the lamp.

The holder 14 is rigidly mounted to the central portion of the lamp 12 at a distance down from or in front of the lamp face 26 and rigidly attached to the brackets 30, at a central position that is co-linear or intersects the central axis 28 and also operable to hold a television camera 50 having a lens 52 directed in the path 28.

In an alternative embodiment of this invention, the holder 14 is provided with a suction cup at its upper or aft end that engages the central portion 54 of the lamp face 26. This cup can be an inverted rubber cup with edges that can be moistened such that the cup can be pressed into the lamp face for rigid attachment thereto.

I claim:

1. In apparatus for illuminating and simultaneously optically reproducing a surgical subject in a surgically sterile field, the improvements comprising:
    a lamp operable to illuminate surfaces at a relatively high light intensity;
    means supporting said lamp;
    means gimballing said lamp on said supporting means whereby said lamp is operable to pivot and rotate with respect to said supporting means through a substantial displacement on a spherical surface corresponding to said gimballing means;
    a directing member;
    means rigidly securing said directing member to said lamp in a manner such that the upper aft portion of said member is proximate the focal axis and optical center of the outer surface of the outermost lens of said lamp at a point forward and below said center;
    and a camera rigidly mounted on said member in such a manner that the focal axis of the outermost lens of said camera is substantially co-linear with the focal axis of the outermost lens of said lamp.

2. The apparatus of claim 1 and a handle portion on said directing member operable to move the lamp and camera attached thereto to a position for the desired maximum illumination and optical reproduction.

3. The apparatus of claim 1 wherein said rigidly securing means comprises a bracket portion fixed to the center of the lamp at one end thereof and fixed to said directing member at the other end thereof.

4. The apparatus of claim 2 wherein said handle portion is in a shape corresponding roughly to a shape of a right circular cylinder and the central axis of said handle is co-linear with the geometrically central axis of said camera and said handle surrounds said camera.

5. The apparatus of claim 1 and a suction cup member attaching said directing member to the face of said lamp.

* * * * *